US006865150B1

(12) United States Patent
Perkins et al.

(10) Patent No.: US 6,865,150 B1
(45) Date of Patent: Mar. 8, 2005

(54) SYSTEM AND METHOD FOR CONTROLLING ADMISSION OF VOICE COMMUNICATIONS IN A PACKET NETWORK

(75) Inventors: Mark M. Perkins, Cupertino, CA (US); Hisham Abdelhamid, Palo Alto, CA (US)

(73) Assignee: Cisco Technology, Inc., San Jose, CA (US)

(*) Notice: Subject to any disclaimer, the term of this patent is extended or adjusted under 35 U.S.C. 154(b) by 0 days.

(21) Appl. No.: 09/544,729

(22) Filed: Apr. 6, 2000

(51) Int. Cl.$^7$ ................................................ H04J 3/14
(52) U.S. Cl. ................ 370/230; 370/232; 370/235; 370/395.21; 370/395.41; 370/449; 370/468
(58) Field of Search ................. 370/230, 231, 370/233, 235, 352, 395.1, 395.21, 395.41, 395.6, 395.64, 395.52, 468, 449, 232, 234, 395.2, 395.61

(56) References Cited

U.S. PATENT DOCUMENTS

| 5,341,366 A | 8/1994 | Soumiya et al. | 370/233 |
| 5,357,507 A | 10/1994 | Hughes et al. | 370/234 |
| 5,583,857 A | 12/1996 | Soumiya et al. | 370/233 |
| 5,751,691 A | 5/1998 | Soumiya et al. | 370/395.21 |
| 5,812,526 A * | 9/1998 | Chang et al. | 370/230 |

(List continued on next page.)

OTHER PUBLICATIONS

Juha Heinanen "Multiprotocol Encapsulation over ATM Adaptation Layer 5," Network Working Group, RFC 1483, Jul. 1993.

The ATM Forum Technical Committee, "ATM Trucking using AAL2 for Narrowband Services" ATM Forum document number af–vtoa–0113.000 (Feb. 1999).

International Telecommunication Union (ITU). ITU–T, I.363.2. Series 1: Integrated Services Digital Network; Overall network aspects and functions—Protocol layer requirements: B–ISDN ATM Adaptation layer specification: Type 2 AAL (Sep. 1997).

International Telecommunication Union (ITU). ITU–T, I.366.2. Series 1: Integrated Services Digital Network; Overall network aspects and functions—Protocol layer requirements: AAL type 2 service specific convergence sublayer for trunking (Feb. 1999).

Jabbari, et al., "Performance of Demand Assignment TDMA and Multicarrier TDMA Satellite Networks," IEEE Journal on Selected Areas in Communications. vol. 20. No. 2. Feb. 1992. pp. 478–486.

Primary Examiner—Dang Ton
Assistant Examiner—Shick Hom
(74) Attorney, Agent, or Firm—Blakely, Sokoloff, Taylor & Zafman LLP

(57) ABSTRACT

A system and method for controlling admission of a communication in a network are disclosed. In the network, a virtual circuit having a predetermined bandwidth is provided. A request is received for a communication having a communication bandwidth, and a total utilized bandwidth of the virtual circuit is calculated, including the communication bandwidth. If the total utilized bandwidth is less than the predetermined bandwidth of the virtual circuit, then admission in the network is granted to the communication.

60 Claims, 8 Drawing Sheets

U.S. PATENT DOCUMENTS

| | | | |
|---|---|---|---|
| 5,826,169 A | 10/1998 | Natarajan | 455/13.1 |
| 5,838,906 A * | 11/1998 | Doyle et al. | 395/200.32 |
| 5,862,126 A | 1/1999 | Shah et al. | 370/395.21 |
| 5,872,771 A | 2/1999 | Park et al. | 370/252 |
| 5,881,049 A | 3/1999 | Beshai et al. | 370/345.21 |
| 5,886,980 A | 3/1999 | Zheng | 370/230 |
| 5,894,471 A | 4/1999 | Miyagi et al. | 370/230 |
| 5,917,804 A | 6/1999 | Shah et al. | 370/230 |
| 5,970,064 A | 10/1999 | Clark et al. | 370/351 |
| 5,982,748 A | 11/1999 | Yin et al. | 370/232 |
| 6,028,840 A | 2/2000 | Worster | 370/230 |
| 6,046,981 A | 4/2000 | Ramamurthy et al. | 370/232 |
| 6,067,287 A | 5/2000 | Chung-Ju et al. | 370/232 |
| 6,075,770 A | 6/2000 | Chang et al. | 370/395.21 |
| 6,141,322 A | 10/2000 | Poretsky | 370/231 |
| 6,212,163 B1 | 4/2001 | Aida | 370/230 |
| 6,215,768 B1 | 4/2001 | Kim | 370/230 |
| 6,266,322 B1 | 7/2001 | Berger et al. | 370/229 |
| 6,292,466 B1 | 9/2001 | Droz | 370/232 |
| 6,314,085 B1 | 11/2001 | Saranka | 370/230 |
| 6,330,226 B1 | 12/2001 | Chapman et al. | 370/232 |
| 6,400,685 B1 | 6/2002 | Park | 370/232 |
| 6,411,601 B1 | 6/2002 | Shaffer et al. | 370/230 |
| 6,418,148 B1 * | 7/2002 | Kumar et al. | 370/468 |
| 6,442,138 B1 | 8/2002 | Yin et al. | 370/232 |
| 6,459,681 B1 | 10/2002 | Oliva | 370/232 |
| 6,487,170 B1 * | 11/2002 | Chen et al. | 370/231 |
| 6,490,249 B1 | 12/2002 | Aboul-Magd et al. | 370/395.2 |
| 6,529,499 B1 * | 3/2003 | Doshi et al. | 370/352 |
| 6,570,855 B1 | 5/2003 | Kung et al. | 370/237 |
| 6,578,077 B1 * | 6/2003 | Rakoshitz et al. | 709/224 |
| 6,608,815 B1 | 8/2003 | Huang et al. | 370/230 |
| 6,625,155 B1 | 9/2003 | Dziong | 370/230 |

* cited by examiner

SYSTEM AND METHOD FOR CONTROLLING ADMISSION OF VOICE COMMUNICATIONS IN A PACKET NETWORK

FIELD OF THE INVENTION

The present invention relates generally to telecommunication systems and, more particularly, to a system and method for controlling admission of a voice communication in a connection-oriented packet network, such as an Asynchronous Transfer Mode (ATM) network.

BACKGROUND OF THE INVENTION

ATM is a switching and multiplexing technique designed for transmitting digital information, such as data, video, and voice, at high speed, with low delay, over a telecommunications network. The ATM network includes a number of switching nodes coupled through communication links. In the ATM network, bandwidth capacity is allocated to fixed-sized units named "cells." The communication links transport the cells from a switching node to another. These communication links can support many virtual connections, also named channels, between the switching nodes. The virtual connections, for example a Virtual Channel Connection (VCC) or a Permanent Virtual Circuit (PVC), assure the flow and delivery of information contained in the cells.

Each cell contains a cell header and cell data. The cell header includes information necessary to identify the destination of that cell. The components of the cell header include, among other things, a Virtual Channel Identifier (VCI) and a Virtual Path Identifier (VPI), for collectively identifying an ATM connection for that particular cell, and a Payload Type Identifier (PTI), for indicating whether the cell is sent from one user to another, whether cell data refers to administration or management traffic, and whether congestion is present within the network.

The ATM Forum, which is a user and vendor group establishing ATM standards, has also defined several ATM service categories, used in characterization of a virtual connection. For example, among them are categories such as (1) a Constant Bit Rate (CBR), which supports a constant or guaranteed rate to transport services, such as video or voice, as well as circuit emulation, which requires rigorous timing control and performance parameters; (2) a Variable Bit Rate (VBR), real time and non real time, which supports variable bit rate data traffic with average and peak traffic parameters; (3) an Available Bit Rate (ABR), which supports feedback to control the source rate in response to changed characteristics in the network; and (4) an Unspecified Bit Rate (UBR).

FIG. 1 illustrates a prior art ATM network 100, typically including several network nodes, also known as switching nodes, 110 connected through single communication links 120. The network 100 is a data transmission network with guaranteed bandwidth and quality of service. Typically, end users 130 access the network 100 and connect to the nodes 110 via similar links 120. Generally, the illustrated communication links 120 carry traffic from many sources to many destinations and may support multiple virtual connections. Although these virtual connections may be statistically multiplexed onto the same link, the network 100 must still meet certain quality of service requirements for each connection. Therefore, the network must allocate an appropriate bandwidth to each connection without disturbing the other connections already in traffic.

Attempts made to allocate the appropriate bandwidth to each connection have resulted in a Connection Admission Control (CAC) process, which uses source traffic characteristics, such as peak cell rate (PCR), average cell rate (ACR), burstiness, and peak duration, and the required quality of service parameters, such as cell loss ratio, cell transfer delay, and jitter, to make a decision whether to accept or reject the connection and to access the amount of bandwidth required by the connection. In the network 100, a user 130 and the network negotiate a traffic contract, whereby the user supplies the traffic characteristics, and the desired quality of service, and the network performs a CAC process to determine whether there is enough free bandwidth to accept the connection.

If the network carries voice communications, such as voice calls, and certain cells are dropped, then all voice calls will suffer degraded voice quality.

SUMMARY OF THE INVENTION

A system and method for controlling admission of a voice communication having a communication bandwidth in a network are disclosed. In the network, a virtual circuit having a predetermined bandwidth is provided. An admission request is received for the communication, and a total utilized bandwidth of the virtual circuit is calculated, including the communication bandwidth. If the total utilized bandwidth is less than the predetermined bandwidth of the virtual circuit, then admission is granted to the communication.

Other features and advantages of the present invention will be apparent from the accompanying drawings, and from the detailed description, which follows below.

BRIEF DESCRIPTION OF THE DRAWINGS

The present invention is illustrated by way of example and not limitation in the figures of the accompanying drawings, in which like references indicate similar elements and in which.

DETAILED DESCRIPTION

In an ATM network, an ATM virtual circuit (VC) having a predetermined bandwidth is provided between two nodes within the network to carry voice communications, such as voice calls, between users. As each voice call is added to or removed from the VC, bandwidth requirements are calculated using a table-based algorithm relying on the number and type of voice calls. If a total utilized bandwidth of the VC, including a bandwidth of a newly added voice call, exceeds the predetermined bandwidth of the VC, then the new call is denied access. An intended advantage of one embodiment is a reliable system for voice communications, which ensures that the used bandwidth does not exceed the bandwidth limit of each communication link.

Figure 1:
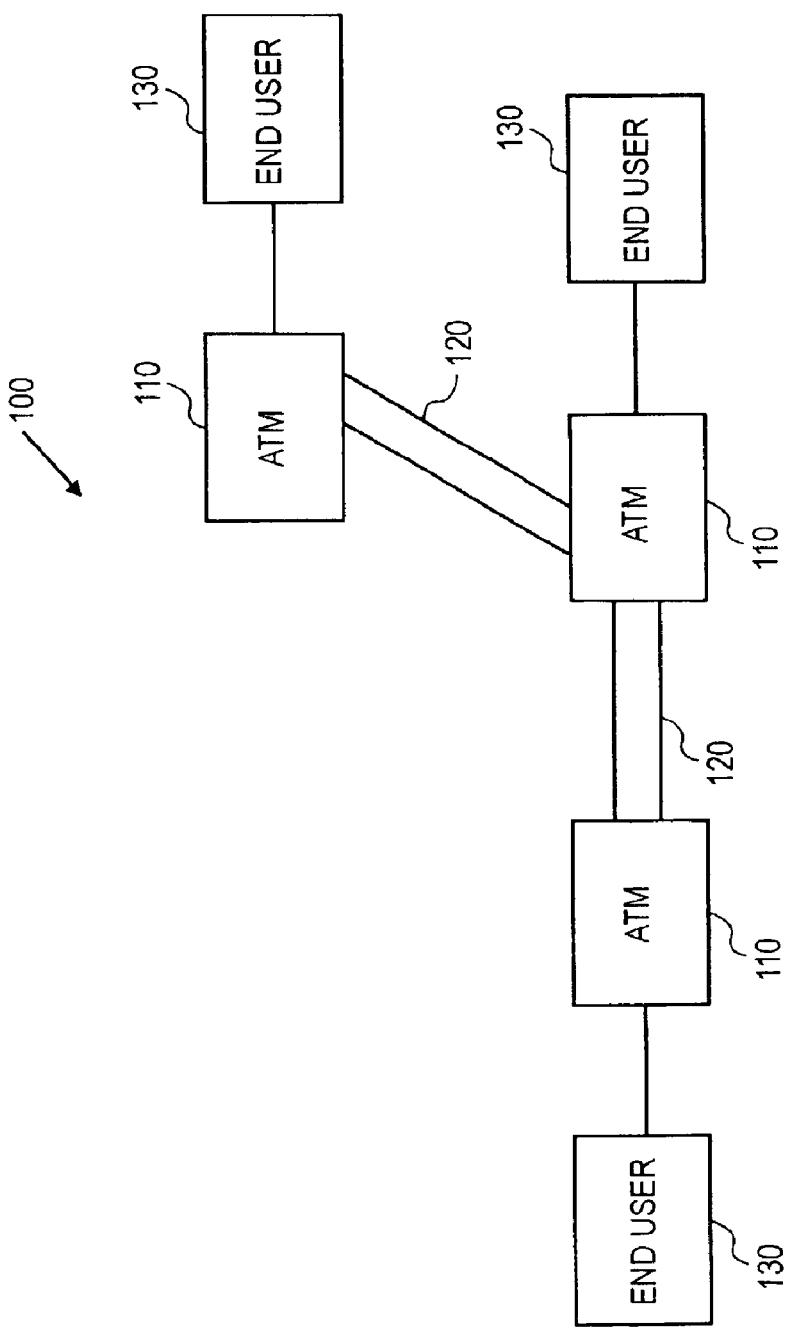
FIG. 1 shows an exemplary connection-oriented network.
Figure 2:
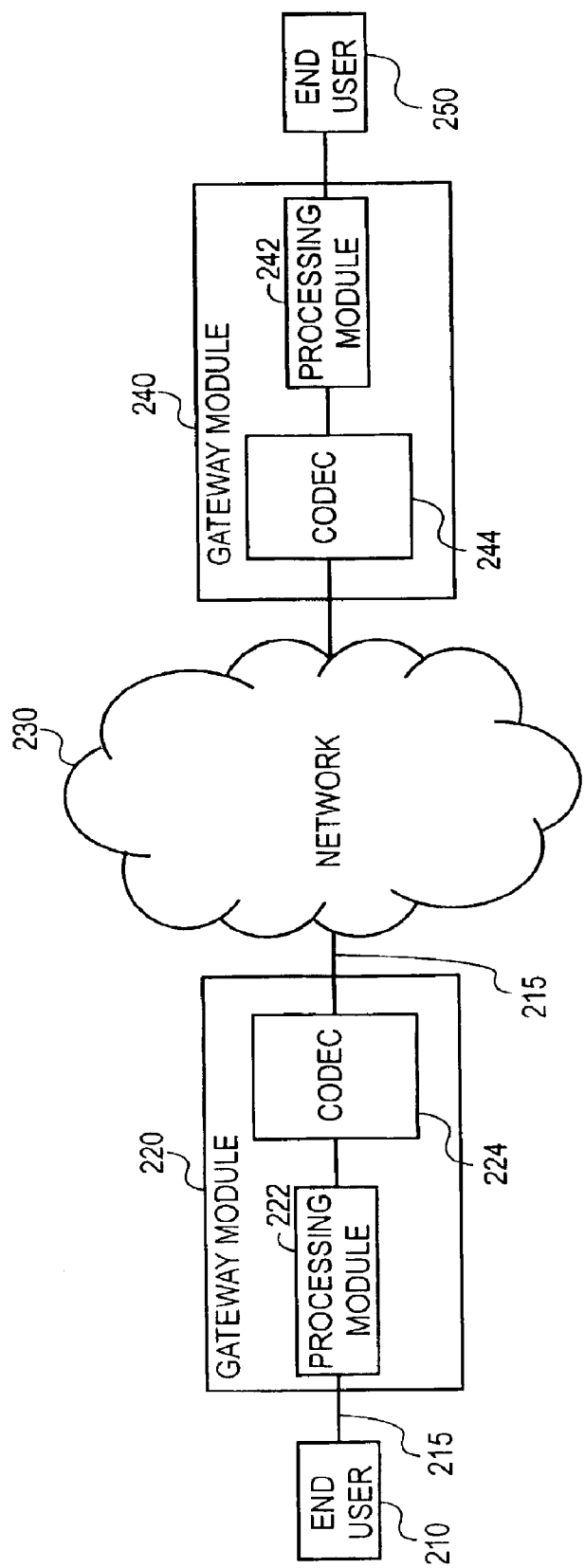
FIG. 2 shows an exemplary packet network for handling voice communications.

As shown in FIG. 2, in one embodiment, an end user 210, trying to initiate a voice call directed to a second end user 250, transmits a sequence of bits along link 215 to a network 230 via a gateway module 220. The gateway module 220 includes a processing module 222 and a coding/decoding translation module (CODEC) 224. In one embodiment, the sequence of bits is transmitted at a standard rate of 8000 bytes/second into CODEC 224, where it is translated into data packets transmitted in cells.

In one embodiment, the translation procedure also includes a compression procedure, applied to reduce redundancy in the data packets. Alternatively, the translation may include a silence suppression algorithm, or Voice Activity Detection (VAD), which results in reducing the transmitted bit rate when the user is not communicating. The VAD algorithm will be described in further detail below.

Referring again to FIG. 2, the data packets are then sent through the network 230 and reach a second CODEC 244, located within a second gateway module 240, prior to being delivered to the second user 250. In CODEC 244, the packets are decoded and translated back into sequence of bits, which are then transmitted to user 250.

In one embodiment, the CODEC modules 224 and 244 are standardized. Among the available standard CODEC modules are, for example, the G.711 CODEC, providing a standard bandwidth of 64 kilobytes per second (kbps), the G.726 CODEC, having a bandwidth of 32 kbps, and the G.729 CODEC, provided with a bandwidth of 8 kbps.

In the network 230, a virtual circuit (VC) is configured with a predetermined bandwidth $BW_{VC}$ in order to carry a particular service type, for example voice calls. In one embodiment, the network provider sets up the VC based on a user's Service Level Agreement (SLA). For example, with VBR real-time, the network provider must guarantee a sustained cell rate (SCR), while with CBR, the network provider must guarantee a peak cell rate (PCR).

In one embodiment, the bandwidth $BW_{VC}$ is calculated using a spreadsheet available to the network provider, which is based on the number of voice calls, associated CODECs, a number of voice-band data connections (clear channel), and the number of fax/modem up-speeds a customer will be allowed from the total voice calls.

The processing module 222 within the gateway module 220 is provided for calculating a total utilized bandwidth $BW_U$ of the VC, and for deciding whether to grant admission to the voice call placed by end user 210. In one embodiment, the processing module 222 is provided with precompiled tables for each encapsulation method, each CODEC type, and each packetization period. These tables give the cell rate (CR), in cells/second, needed when a certain number of voice calls are active. In one embodiment, the precompiled table for different standard CODEC values for the Voice over IP over ATM Adaptation Layer 5(AAL5) encapsulation (VoIP) is shown as Table 1. Similarly, the precompiled table for the Voice over ATM Adaptation Layer 2 (AAL2) encapsulation (VoAAL2) is shown as Table 2. Alternatively, other precompiled tables may be provided for other encapsulation methods, such as the Voice over Frame Relay encapsulation (VoFR).

TABLE 1

VoIP Bandwidth Table

| CODEC (i) | Cell Rate ($CR_{VoIP}(i)$) |
|---|---|
| G.711, 5 ms | 400 |
| G.711, 10 ms | 300 |
| G.726-32, 5 ms | 400 |
| G.726-32, 10 ms | 200 |
| G.729-8, 10 ms | 200 |
| G.729-8, 20 ms | 100 |

TABLE 2

VoAAL2 Bandwidth Table

| CODEC (i) | $CR_{VoAAL2}(i, n)$ for n = 1 |
|---|---|
| G.711, 5 ms | 200 |
| G.726-32, 5 ms | 200 |
| G.726-32, 10 ms | 100 |
| G.729-8, 10 ms | 100 |
| G.729-8, 20 ms | 50 |

Bandwidth savings due to VAD are a function of the total number of calls that have the VAD feature active. In one embodiment, bandwidth savings obtained through application of VAD are represented in a precompiled table, having bandwidth savings multipliers as entries. In one embodiment, the bandwidth savings multipliers are calculated off-line based on inputs to a model of VAD bandwidth savings, which could be user configurable.

Alternatively, a set of VAD precompiled tables may be provided without departing from the scope of the present invention. Also, formulas can be used for dynamically calculating table values based on configuration parameters.

VAD Bandwidth Savings Computation

A method for calculating the bandwidth savings will be described in detail below in connection with FIG. 3. In one embodiment, the VAD bandwidth savings multipliers are calculated off-line and the results may be downloaded, hard-coded, or pre-provisioned to the gateway module. Alternatively, the VAD algorithm may be implemented in real time on the gateway module.

Figure 3:
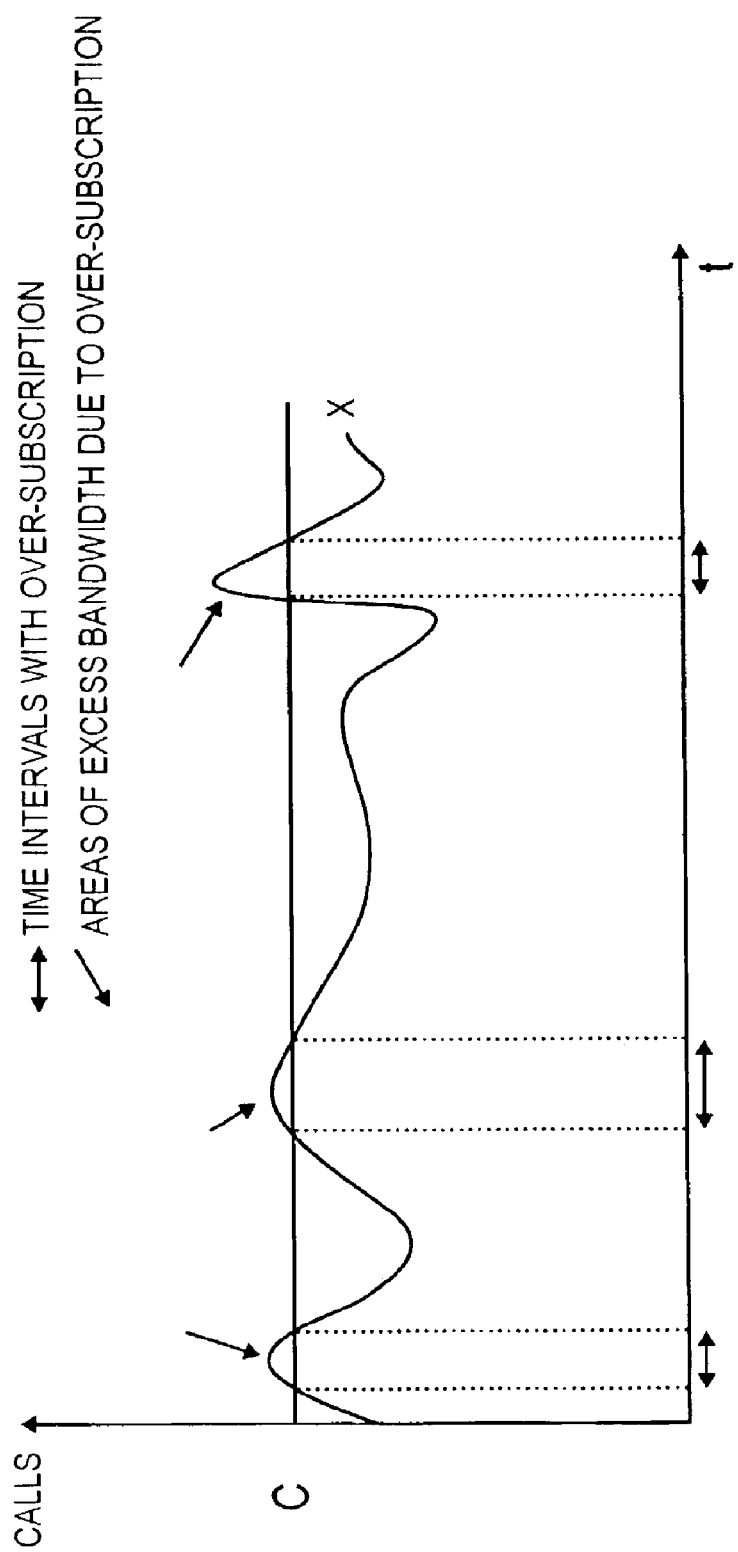
FIG. 3 is a graphic representation of values of the total utilized bandwidth as a function of time.

FIG. 3 illustrates a graph showing bandwidth required as a function of time. Referring to FIG. 3, in one embodiment, if the VAD feature is not active, the bandwidth is constant in time and its value is predetermined and dependent only on the number of calls existent within the network. If the VAD feature is activated, then the bandwidth varies in time as shown in FIG. 3. Considering x the number of active voice calls from the total number of calls allowed, during certain time intervals, because of over-subscription, x is higher than the predetermined value C for the number of calls allocated within the network. Therefore, areas of excess bandwidth appear and cells are dropped due to the over-subscription.

In one embodiment, the method for calculating the bandwidth savings relies on a cell drop interval ratio D, representing a measure of the time intervals during which the aggregate bandwidth of simultaneous voice calls exceeds the predetermined bandwidth of the virtual circuit. Considering that q is the probability that a call is active;

A is the number of calls allowed on the virtual circuit;

x is the number of active voice calls from the total number of calls allowed, wherein x is a binomial function with parameters q and A;

C is the predetermined bandwidth, which is an integer; and

D is the cell drop interval ratio;

the optimization task is to find the lowest value for C in the equation $$1 - \sum_{x=0}^{C} \binom{A}{x} q^x (1-q)^{A-x} \leq D \text{ or } 1 - \sum_{x=0}^{C} P(x) \leq D$$

Solving this equation involves an iterative procedure until an acceptable value for C is obtained, given q, A, and D. The bandwidth savings value or VAD factor, f(A), can be calculated as f(A)=C/A. In one embodiment, the method is implemented in C languages software. Alternatively, other software or hardware implementations may be used to obtain C and f(A)=C/A.

Figure 3A:
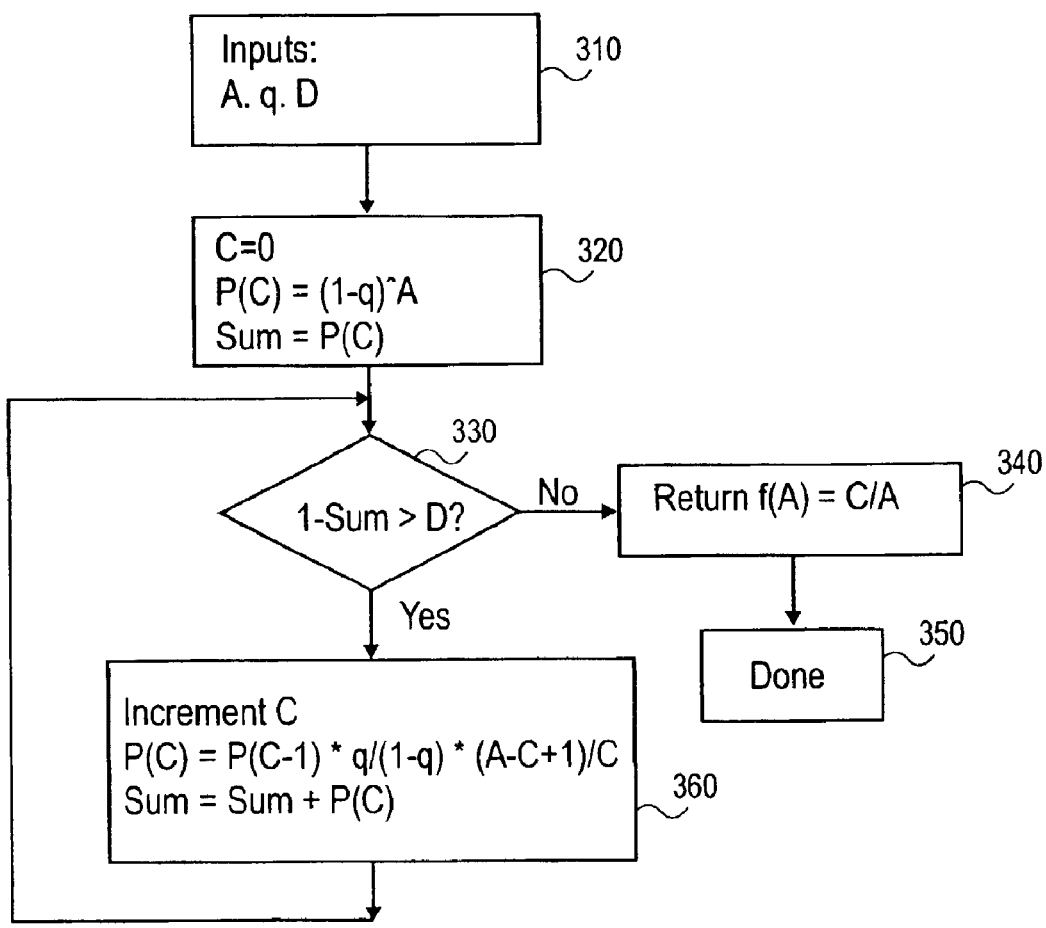
FIG. 3a is a flow diagram representing a method for calculating bandwidth savings according to one embodiment.

FIG. 3a is a flow diagram representing the method for calculating bandwidth savings according to this embodiment. As shown in FIG. 3a, at processing block 310, the values for A, the number of calls allowed on the virtual circuit, q, the probability that a call is active, and D, the cell drop interval ratio are input.

Next, at processing block 320, the predetermined bandwidth C is initialized to a value of zero and P(x) is calculated as (1−q) raised to the power of A for x=C=0. Also, a variable Sum is introduced as Sum=P(C).

At processing block 330, (1-Sum) is compared to D and a decision is made whether (1-Sum) is greater than D. If (1-Sum) is greater than D, then the VAD factor f(A)=C/A is returned at processing block 340 and the procedure stops at processing block 350.

Otherwise, at processing block 360, C is incremented and a new value for P(C) is calculated as a function of P(C-1), A, C, and q. Then Sum is updated to Sum=Sum+P(C) and blocks 330 through 360 are iteratively performed until a value f(A) can be returned.

In an alternate embodiment, the method for calculating the bandwidth savings relies on an acceptable over-subscription drop ratio DR, representing a measure of the cell loss that results when the aggregate bandwidth of simultaneous voice calls exceeds the predetermined bandwidth. Considering that q is the probability that a call is active;

A is the number of calls allowed on the virtual circuit;

x is the number of active voice calls from the total number of calls allowed, wherein x is a binomial function with parameters q and A;

C is the predetermined bandwidth, which may be an integer or a non-integer value; and DR is the acceptable over-subscription drop ratio; the optimization task involves finding C such that the drop ratio DR constraint is met.

For example, the task is to find C such that $$DR = \frac{\sum_{x=\lceil C \rceil}^{A} (x-C) \cdot P\{x\}}{\sum_{x=0}^{A} x \cdot P\{x\}} = \frac{1}{qA} \sum_{x=\lceil C \rceil}^{A} (x-C) \cdot \binom{A}{x} \cdot q^x \cdot (1-q)^{A-x}$$

wherein P{x}=Pr{x calls are active |VAD factor q and A total calls}. In one embodiment, the method is implemented in C language software. Alternatively, other software or hardware implementations may be used to obtain C and the VAD factor f(A), where f(A)=C. This alternate embodiment described above is similar to the method described in the article by Bijan Jabbari and David McDysan entitled *Performance of Demand Assignment TDMA and Multicarrier TDMA Satellite Networks*, in IEEE Journal on Selected Areas in Communications, vol. 10, No. 2, February 1992, pp. 478–486. However, the method described in the article assumes only integer values for C, wherein the predetermined bandwidth C in this alternate embodiment may be an integer or a non-integer value.

Bandwidth Computation

Generally, every time a call is made, a sum of the total utilized bandwidth, $BW_U$, is calculated. For a voice call to be admitted, the calculated $BW_U$, including the bandwidth of the call to be admitted, must not exceed the predetermined bandwidth $BW_{VC}$.

If $BW_U < BW_{VC}$, the voice call is accepted.

If $BW_U > BW_{VC}$, the voice call is rejected.

When a voice call is released, $BW_U$ is recomputed without taking in consideration the bandwidth of the released call and that call is no longer involved in future calculations. The calculation of $BW_U$ for different encapsulations, such as VoIP and VoAAL2, is described in detail below.

1. Bandwidth Computation with VoIP Encapsulation

Figure 4:
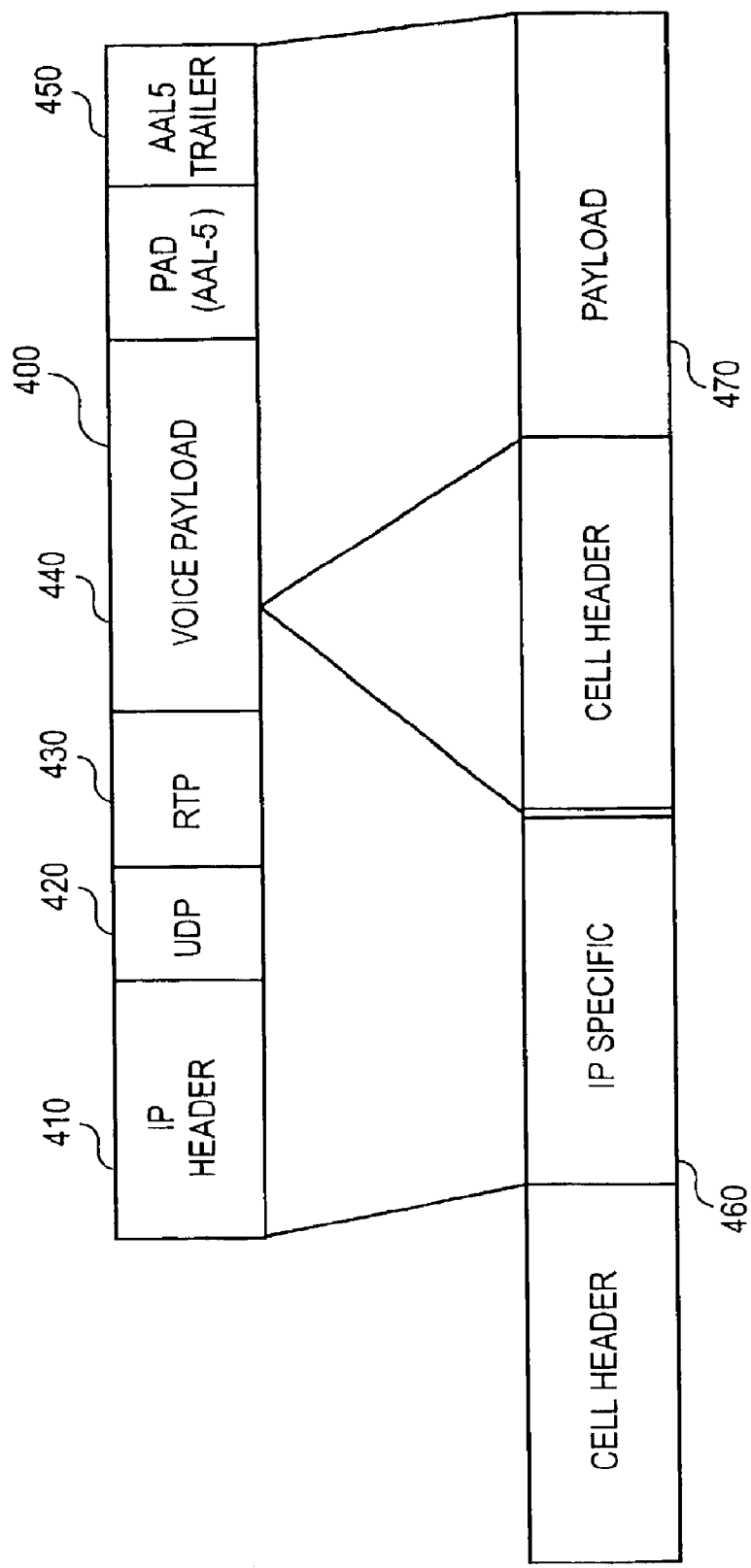
FIG. 4 is a diagram of the Voice over IP encapsulation format.

FIG. 4 illustrates a diagram of the VoIP encapsulation format. Referring to FIG. 4, the VoIP encapsulation is Voice/RTP/UDP/IP/AAL-5/ATM according to RFC 1483, Section 5.1, *VC Based Multiplexing of Routed Protocols*. In one embodiment, the voice packets 400 include an IP header 410, an UDP header 420, an RTP header 430, voice payload 440, and an AAL-5 trailer 450. The overhead needed is as follows:

| For the headers: | |
|---|---|
| RTP | 12 bytes |
| UDP | 8 bytes |
| IP | 20 bytes |
| For the trailer: | |
| AAL-5 Trailer | 8 bytes |

The headers and AAL-5 trailer total 48 bytes and require one ATM cell 460 to transport data. In one embodiment, in the VoIP encapsulation, irrespective of the encoding scheme considered, two ATM cells 460, 470 are needed to transport one voice data packet. Alternatively, other number of ATM cells, such as three, may be used to transport one digitized voice packet.

At the same time, in one embodiment, an RTP control protocol (RTCP) is used to monitor the quality of service and to convey information about users in an ongoing RTP session. The protocol is based on periodic transmission of control packets to all users in the session, using the same distribution mechanism as the data packets. The underlying protocol must provide multiplexing of data and control packets, for example using separate port numbers with UDP. The main RTCP packets are SR (sender reports) and RR (receiver reports). In one embodiment, the fraction of the session bandwidth allocated to RTCP is 5%, and the RTCP interval between transmissions has a fixed minimum of 5 seconds. Therefore, the fraction of bandwidth needed for RTCP traffic $g_{RTCP}$ is set at $g_{RTCP}=0.05$.

With i being the CODEC type with a particular packetization period, $CR_{VoIP}(i)$ representing the cell rate, or bandwidth with VoIP encapsulation, in cells per second (cells/s), of one call of a particular encoding type/packetization period with no VAD, vps(i) being the voice packet size for an encoding type with a particular packetization period, ovrhd representing the total overhead of the encapsulation scheme, and pd(i) being the packetization delay of the particular encoding type, then cvp(i) representing a number of ATM cells per voice packet may be calculated with the formula:

$$cvp(i) = \left\lceil \frac{vps(i) + ovrhd}{48} \right\rceil$$

and the cell rate $$CR_{VoIP}(i) = \frac{cvp(i)}{pd(i)}$$

In one embodiment, cvp(i)=2 for a majority of the encoding schemes or CODEC types considered. Alternatively, for the particular G.711 CODEC type, with a 10 ms packetization delay, cvp(i)=3.

Further, considering $N_{i/VAD}$ as the total number of calls of a particular encoding type (and a specific packetization period) that have the VAD feature active, $N_{i/no\_VAD}$ as the total number of calls of a particular encoding type (and a specific packetization period) that do not have the VAD feature active, $g_{RTCP}$ as the fraction of bandwidth needed for RTCP traffic, and $f(\Sigma N_{i/VAD})$ as a VAD bandwidth multiplier factor based on the total number of calls having active VAD features, then the utilized bandwidth $BW_U$ may be calculated as:

$$BW_U = [1 + g_{RTCP}] \times \sum_i N_{i/no\_VAD} \times CR_{VoIP}(i) +$$

$$\left[ f\left(\sum_i N_{i/VAD}\right) + g_{RTCP} \right] \times \sum_i N_{i/VAD} \times CR_{VoIP}(i)$$

2. Bandwidth Computation with VoAAL2 Encapsulation

In one embodiment, examples of standards relevant to encapsulating voice over AAL2 are ITU-T I.363.2 and I.366.2, and ATM Forum af-vtoa-113. The ITU-T I.366.2 standard specifies packet formats and procedures to accommodate known techniques of low bit rate audio encoding and silence suppression.

Figure 5A:
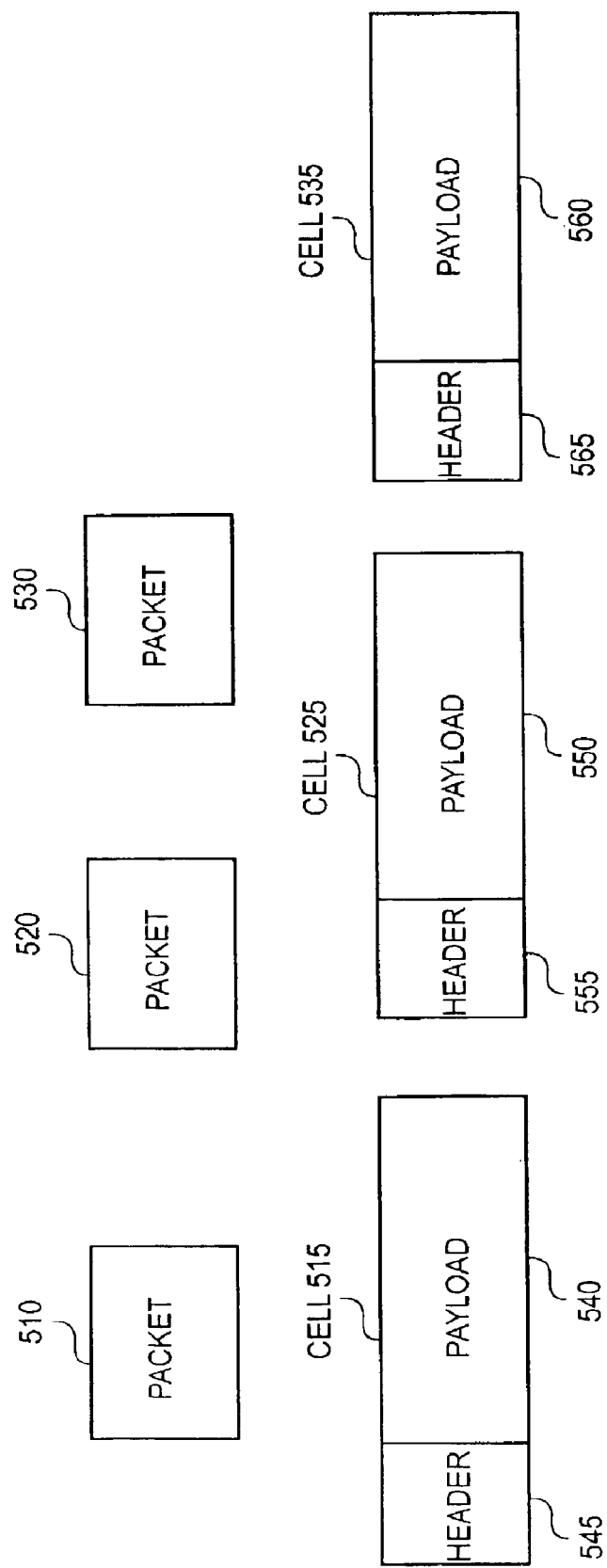
FIG. 5a is a diagram of a Voice over AAL2 encapsulation of multiple voice packets into cells.

FIG. 5a is a diagram illustrating a VoAAL2 encapsulation of multiple voice packets into ATM cells. Referring to FIG. 5a, voice packets 510, 520, 530 are sent at various time intervals and are encapsulated into ATM cells 515, 525, 535. Each ATM cell 515, 525, 535 contains an ATM header 545, 555, 565 and payload 540, 550, 560. In one embodiment, during a sub-multiplexed encapsulation of voice packets, the voice payloads within voice packets 510, 520, 530 overlap cell payload boundaries. Therefore, once an ATM cell is full, the remaining data is transferred to a subsequent ATM cell. For example, packet 510 is encapsulated into cell 515 together with a portion of packet 520. The remaining data within packet 520 is then encapsulated into cell 525 together with packet 530. Alternatively, during a non sub-multiplexed encapsulation, each voice packet is encapsulated into one ATM cell, allowing cell space to remain unused.

Figure 5B:
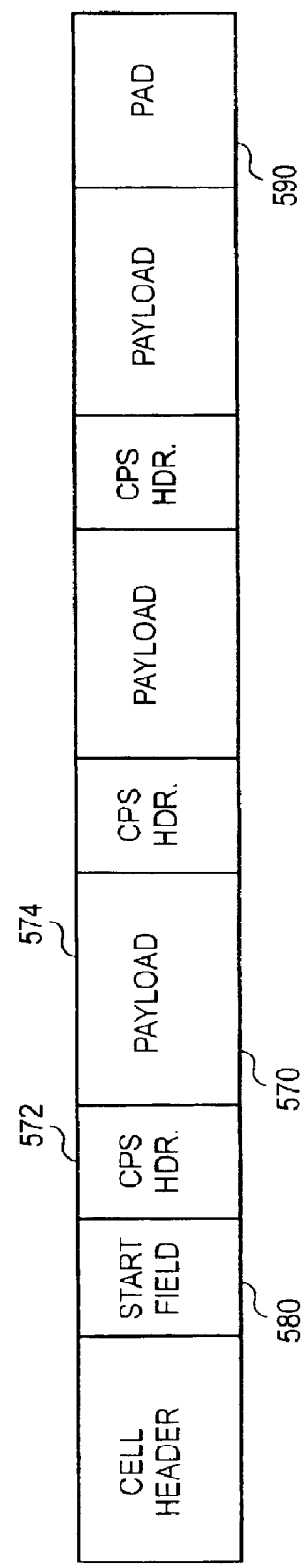
FIG. 5b is a diagram of the Voice over AAL2 encapsulation format.

FIG. 5b illustrates a diagram of the VoAAL2 encapsulation format. Referring to FIG. 5b, a common part sub-layer (CPS) packet 570 consists of a CPS packet header 572 and information passed from the higher layer of the source stored in payload 574. The CPS packet header is a three-octet field containing four subfields: a channel identifier (CID), a length indication (LI) for variable size CPS packets, a CPS user-to-user indication (UUI), and header error control. Multiple CPS packets 570 are encapsulated into an ATM cell with a single byte header, for example Start Field header (STF) 580. The STF header 580 is used to indicate the beginning of the first CPS packet 570 in an ATM cell, since the AAL2 sub-multiplexed encapsulation allows the overlap of a CPS packet over two consecutive cells and a first byte of an ATM cell payload is not always the beginning of the CPS packet.

Thus, with the AAL2 encapsulation, each voice packet 570 has three bytes of overhead, and each cell has an additional one byte overhead. With sub-multiplexing of cells, an ATM cell payload may have more than one voice payload 574. As shown FIG. 5b, in one embodiment, an ATM cell, especially the last cell to receive voice packets, may not be completely full. As a result, a padding (PAD) 590 is added to the cell payload to allow a full ATM cell to be sent through the network. Alternatively, voice packets fill up the ATM cells and no padding is necessary.

The computation methods described below account for the bandwidth used by the VoAAL2 connection with a mix of encoding and packetization periods. Considering i a CODEC type with a particular packetization period, $N_i$ a total number of active calls of a particular CODEC type, vps(i) a voice packet size for an encoding type with a particular packetization period, pd(i) a packetization delay of the encoding type, and $CR_{VoAAL2}(i,N_i)$ the cell rate, or bandwidth per call, in cells/s, used by the particular encoding type, then cvp(i,$N_i$) representing a number of ATM cells that could encapsulate $N_i$ voice packets encoded using the CODEC type i is calculated using the formula:

$$cvp(i, N_i) = \left\lceil \frac{N_i \times [vps(i) + 3]}{47} \right\rceil$$

and $CR_{VoAAL2}(i,N_i)$ is calculated as follows:

$$CR_{VoAAL2}(i, N_i) = \frac{cvp(i, N_i)}{N_i \times pd(i)}$$

In one embodiment, considering a non sub-multiplexed AAL2, where only one voice sample is provided per ATM cell, and voice payloads do not overlap cell boundaries, the bandwidth per call, $CR_{VoAAL2\_nomux}$ used by the encoding type i may be calculated as follows:

$$CR_{VoAAL2\_nomux}(i) = CR_{VoAAL2}(i,1)$$

Then, the total utilized bandwidth $BW_U$ becomes:

$$BW_U = \sum_i N_{i/no\_VAD} \times CR_{VoAAL2\_nomux}(i) + f\left(\sum_i N_{i/VAD}\right) \times$$

$$\sum_i N_{i/VAD} \times CR_{VoAAL2\_nomux}(i)$$

where $f(\Sigma N_{i/VAD})$ is the VAD bandwidth multiplier factor.

Alternatively, considering a sub-multiplexed AAL2, the total utilized bandwidth $BW_U$ may be calculated using a succession of formulas shown below.

$$f(0) = 1$$

-continued $$M_{VAD} = \sum_i N_{i/VAD}$$

$$M_{no\_VAD} = \sum_i N_{i/no\_VAD}$$

$$M = \lfloor M_{no\_VAD} + f(M_{VAD}) \times M_{VAD} \rfloor$$

$$BW_U = \sum_i N_{i/no\_VAD} \times CR_{VoAAL2}(i, M) + f(M_{VAD}) \times \sum_i N_{i/VAD} \times CR_{VoAAL2}(i, M)$$

where i is a CODEC type with a particular packetization period; $N_{i/VAD}$ is a total number of calls of a particular encoding type (and a specific packetization period) that have the VAD feature active; $N_{i/no\_VAD}$ is a total number of calls of a particular encoding type (and a specific packetization period) that do not have the VAD feature active; M is a total number of calls in the AAL2 VC adjusted by a VAD factor; $M_{VAD}$ is a total number of calls in the AAL2 VC that have the VAD feature active; $M_{no\_VAD}$ is a total number of calls in the AAL2 VC that do not have the VAD feature active; $CR_{i,VoAAL2}(i, M)$ is a bandwidth per call, in cells/s, used by the particular encoding type, given a total of M calls in the AAL2 VC; and $f(M_{VAD})$ is the VAD bandwidth savings multiplier factor corresponding to $M_{VAD}$.

In a second alternate embodiment relying on the sub-multiplexed VoAAL2 encapsulation, the total utilized bandwidth $BW_U$ may be calculated based on a cell rate per polling period, as described in detail below.

In the second alternate embodiment, the voice packets are collected into several buffers. Alternatively, the voice packets may be collected into a single buffer for further processing. Subsequent to the buffering of the voice packets, at certain time intervals, the buffered voice packets are encapsulated into ATM cells and are sent through the network.

Considering that i is the encoding method with a particular packetization period;

$N_i$ is the total number of calls of a particular type that are currently active;

vps(i) is the voice packet size for an encoding method with a particular packetization period;

pd(i) is the packetization delay of the encoding method, in seconds; and

TP is polling period for a particular hardware implementation, in seconds; the bandwidth savings due to VAD are calculated in this case as described above. If f(N) is the VAD bandwidth savings factor found from a VAD table savings look-up, and N is the number of calls having VAD active, then $f(0)=1$.

The cell rate required by an AAL2 voice call depends on how the voice data packets are packed into ATM cells. For a particular CODEC, the minimum cell rate $CR_{VoAAL2,min}(i)$ is calculated as follows:

$$CR_{VoAAL2,min}(i) = \frac{vps(i) + 3}{47 \times pd(i)}$$

In one embodiment, the voice packets are uniformly distributed to each buffer. The buffers containing voice packets are polled sequentially with a polling period TP using a round-robin polling procedure. Alternatively, other polling methods may be used to contact the buffers and segment the voice packets from each buffer into ATM cells.

At the end of a polling period, the voice packets are sent to the AAL2 CPS layer of the ATM cells. The cell rate will be the sum of the minimum cell rate for each voice call and the cell rate caused by PAD.

In one embodiment, PAD is the average padding that must be added to an ATM cell. In one embodiment, the average value for PAD is half of the size of an ATM cell payload, i.e. 24 bytes. Using the average value of PAD, the adjusted cell rate (ACR) in a polling period, in cells/second, can be calculated using the following formula:

$$ACR = \sum_i N_{i/no\_VAD} \times CR_{VoAAL2,min}(i) + f\left(\sum_i N_{i/VAD}\right) \times \sum_i N_{i/VAD} \times CR_{VoAAL2,min}(i) + \frac{PAD}{47 \times TP}$$

If $CR_{VoAAL2, nomux}$ is the cell rate for non sub-multiplexed AAL2 encapsulation described above, then it can be calculated using the following formula:

$$CR_{VoAAL2,nomux} = \sum_i N_{i|no\_VAD} \times CR_{VoAAL2,nomux}(i) + f\left(\sum_i N_{i|VAD}\right) \times \sum_i N_{i|VAD} \times CR_{VoAAL2,nomux}(i)$$

Because $CR_{VoAAL2, nomux}$ is an upper bound on the cell rate and ACR sometimes overestimates the cell rate, the final bandwidth is the minimum of the two. For a mix of voice calls Ni of encoding type i, the total utilized bandwidth is then $$BW_U = \min(CR_{VoAAL2,nomux}, ACR)$$

Figure 6:
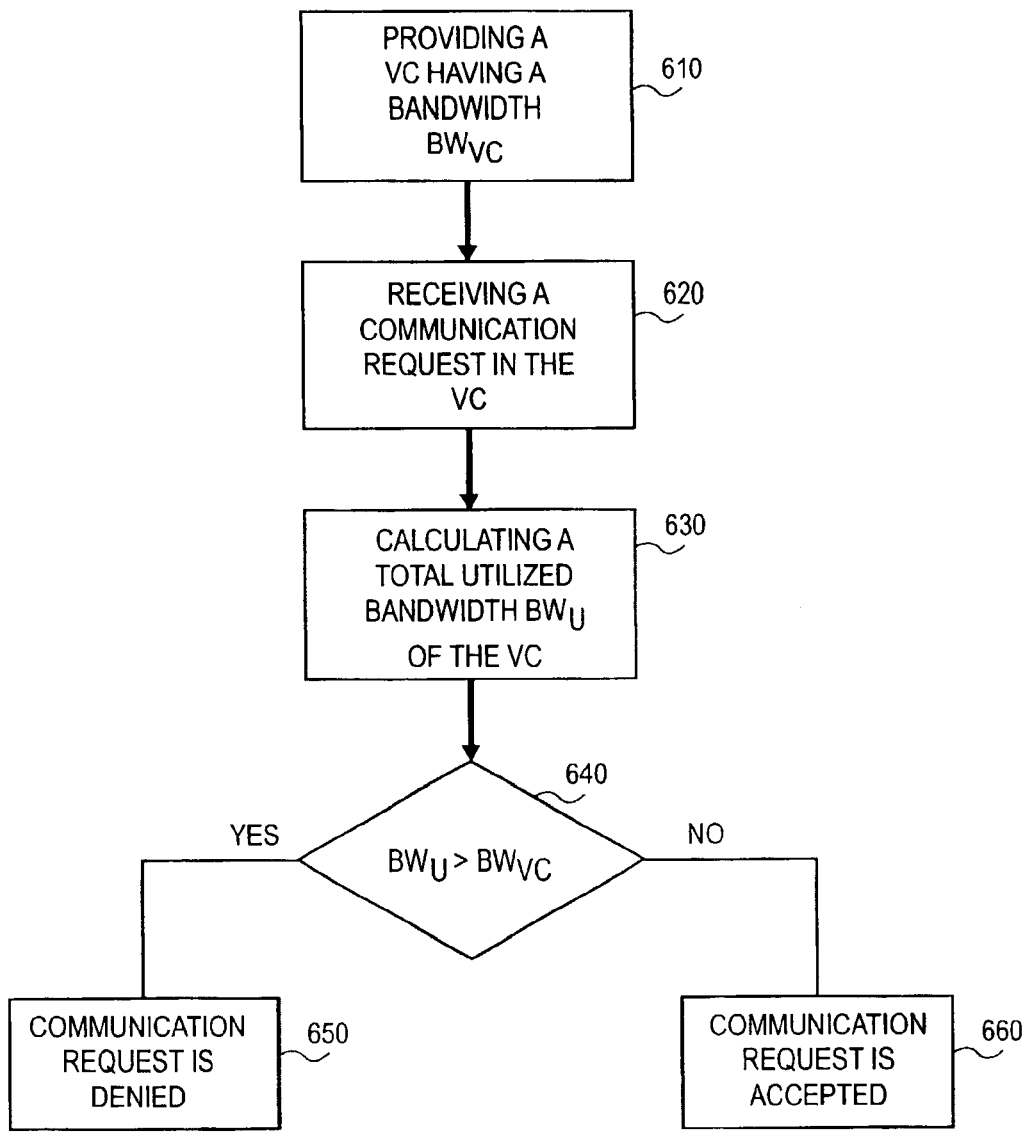
FIG. 6 is a flow diagram representing the process of controlling admission of a voice communication in the network.

FIG. 6 shows a flow diagram representing the process of controlling admission of a voice communication in the network. At processing block 610, a VC having a predetermined bandwidth $BW_{VC}$ is provided in the network. At processing block 620, the network receives a communication request from a user. A total utilized bandwidth $BW_U$, including the bandwidth of the requested communication, is calculated at processing block 630 and the result is further compared with the predetermined bandwidth of the VC. At processing block 640, a decision is made based on the comparison between $BW_U$ and $BW_{VC}$. If $BW_U$ is greater than $BW_{VC}$, then the communication is denied at processing block 650. Alternatively, if $BW_U < BW_{VC}$, then the communication is accepted at processing block 660.

The foregoing discussion has been presented in the context of an Asynchronous Transfer Mode (ATM) network. However, the invention may be implemented with other types of networks, such as Frame Relay networks or Internet Protocol networks. The specification also refers to a virtual circuit VC within the ATM network as a communication path. Alternatively, the invention may be implemented with other types of communication paths or virtual circuits, such as a Permanent Virtual Circuit (PVC), a Switched Virtual Circuit (SVC), or a combination of PVCs and SVCs.

It is also to be understood that embodiments of this invention may be used as or to support software programs executed upon some form of processing core (such as the CPU of a computer) or otherwise implemented or realized upon or within a machine readable medium. A machine readable medium includes any mechanism for storing or transmitting information in a form readable by a machine (e.g., a computer). For example, a machine readable medium includes read-only memory (ROM); random access memory (RAM); magnetic disk storage media; optical storage media;

flash memory devices; electrical, optical, acoustical or other form of propagated signals (e.g., carrier waves, infrared signals, digital signals, etc.); or any other type of media suitable for storing or transmitting information.

In the foregoing specification, the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than a restrictive sense.

What is claimed is:

1. A method for controlling admission of a voice communication having a communication bandwidth in a network, said method comprising:

providing a virtual circuit in said network, said virtual circuit having a predetermined bandwidth, wherein said virtual circuit includes a plurality of voice data packets containing at least one active voice data packet and at least one inactive voice data packet;

receiving an admission request for said communication in said virtual circuit;

calculating a total utilized bandwidth of said virtual circuit according to a predetermined formula, said total utilized bandwidth including said communication bandwidth, wherein said calculating is performed according to an ATM Voice over IP (VoIP) encapsulation, said plurality of voice data packets being encapsulated into a plurality of ATM cells using said VoIP encapsulation, wherein said calculating further comprises:

calculating a cell rate as a function of a number of ATM cells of said plurality of ATM cells necessary to encapsulate one voice data packet of said plurality of voice data packets; and calculating said total utilized bandwidth using said cell rate, said at least one active voice data packet, and said at least one inactive voice data packet; and granting admission to said communication if said total utilized bandwidth is less than said predetermined bandwidth of said virtual circuit.

2. The method according to claim 1, wherein said network is an Asynchronous Transfer Mode (ATM) network.

3. The method according to claim 1, wherein said calculating is performed using lookup tables.

4. The method according to claim 1, wherein said predetermined bandwidth of said virtual circuit is calculated by a user according to a spreadsheet.

5. The method according to claim 1, wherein said one active voice data packet has an active silence suppression mechanism and said inactive voice data packet has an inactive silence suppression mechanism.

6. The method according to claim 1, further comprising updating said total utilized bandwidth when a second admission request for a second communication having a second communication bandwidth is received in said virtual circuit of said network, said total utilized bandwidth including said second communication bandwidth.

7. A method for controlling admission of a voice communication having a communication bandwidth in a network, said method comprising:

providing a virtual circuit in said network said virtual circuit having a predetermined bandwidth, wherein said virtual circuit includes a plurality of voice data packets containing at least one active voice data packet having an active silence suppression mechanism and at least one inactive voice data packet having an inactive silence suppression mechanism;

providing at least one buffer for collecting said plurality of voice data packets;

polling said at least one buffer for a predetermined polling period of time to extract said plurality of voice data packets;

encapsulating said plurality of voice data packets into a plurality of ATM cells for transmission through said network;

receiving an admission request for said communication in said virtual circuit;

calculating a total utilized bandwidth of said virtual circuit according to a predetermined formula, said total utilized bandwidth including said communication bandwidth, wherein said calculating is performed according to an ATM Voice over Adaptation Layer Type 2 (VoAAL2) encapsulation; and granting admission to said communication if said total utilized bandwidth is less than said predetermined bandwidth of said virtual circuit.

8. The method according to claim 7, wherein said ATM Voice over Adaptation Layer Type 2 (VoAAL2) encapsulation is sub-multiplexed.

9. The method according to claim 7, wherein said ATM Voice over Adaptation Layer Type 2 (VoAAL2) encapsulation is non sub-multiplexed.

10. The method according to claim 7, wherein each voice data packet of said plurality of voice data packets is encapsulated into one ATM cell of a plurality of ATM cells using said VoAAL2 encapsulation.

11. The method according to claim 7, wherein voice data packets of said plurality of voice data packets are encapsulated to fill up each ATM cell of a plurality of ATM cells using said VoAAL2 encapsulation.

12. The method according to claim 7, wherein said calculating further comprises:

calculating a cell rate as a function of a plurality of ATM cells necessary to encapsulate one voice data packet of said plurality of voice data packets; and calculating said total utilized bandwidth using said cell rate, said at least one active voice data packet, and said at least one inactive voice data packet.

13. The method according to claim 7, wherein said calculating further comprises:

determining an average padding value for a number of bytes necessary to be added to each ATM cell of said plurality of ATM cells subsequent to said encapsulating of said plurality of voice data packets;

calculating a minimum cell rate as a function of a size of one voice data packet of said plurality of voice data packets;

calculating an adjusted cell rate as a function of said minimum cell rate, said predetermined polling period, said at least one active voice data packet, and said at least one inactive voice data packet; and calculating an encapsulation cell rate as a function of said at least one active voice data packet, and said at least one inactive voice data packet.

14. The method according to claim 13, wherein said calculating further comprises calculating said total utilized bandwidth as a minimum between said adjusted cell rate and said encapsulation cell rate.

15. A computer readable medium containing executable instructions which, when executed in a processing system, cause the system to perform a method for controlling admission of a voice communication having a communication bandwidth in a network, the method comprising:

providing a virtual circuit in said network, said virtual circuit having a predetermined bandwidth, wherein said virtual circuit includes a plurality of voice data packets containing at least one active voice data packet and at least one inactive voice data packet;

receiving an admission request for said communication in said virtual circuit;

calculating a total utilized bandwidth of said virtual circuit according to a predetermined formula, said total utilized bandwidth including said communication bandwidth, wherein said calculating is performed according to an ATM Voice over IP (VoIP) encapsulation said plurality of voice data packets being encapsulated into a plurality of ATM cells using said VoIP encapsulation wherein said calculating further comprises:

calculating a cell rate as a function of a number of ATM cells of said plurality of ATM cells necessary to encapsulate one voice data packet of said plurality of voice data packets; and calculating said total utilized bandwidth using said cell rate said at least one active voice data packet and said at least one inactive voice data packet; and granting admission to said communication if said total utilized bandwidth is less than said predetermined bandwidth of said virtual circuit.

16. The computer readable medium according to claim 15, wherein said network is an Asynchronous Transfer Mode (ATM) network.

17. The computer readable medium according to claim 15, wherein said calculating is performed using lookup tables.

18. The computer readable medium according to claim 15, wherein said predetermined bandwidth of said virtual circuit is calculated by a user according to a spreadsheet.

19. The computer readable medium according to claim 15, wherein said one active voice data packet has an active silence suppression mechanism and said inactive voice data packet has an inactive silence suppression mechanism.

20. The computer readable medium according to claim 15, wherein said method further comprises updating said total utilized bandwidth when a second admission request for a second communication having a second communication bandwidth is received in said virtual circuit of said network, said total utilized bandwidth including said second communication bandwidth.

21. A computer readable medium containing executable instructions which when executed in a processing system, cause the system to perform a method for controlling admission of a voice communication having a communication bandwidth in a network, the method comprising:

providing a virtual circuit in said network said virtual circuit having a predetermined bandwidth, wherein said virtual circuit includes a plurality of voice data packets containing at least one active voice data Racket having an active silence suppression mechanism and at least one inactive voice data packet having an inactive silence suppression mechanism;

providing at least one buffer for collecting said plurality of voice data packets;

polling said at least one buffer for a predetermined polling period of time to extract said plurality of voice data packets;

encapsulating said plurality of voice data packets into a plurality of ATM cells for transmission through said network;

receiving an admission request for said communication in said virtual circuit;

calculating a total utilized bandwidth of said virtual circuit according to a predetermined formula, said total utilized bandwidth including said communication bandwidth, wherein said calculating is performed according to an ATM Voice over Adaptation Layer Type 2 (VoAAL2) encapsulation; and granting admission to said communication if said total utilized bandwidth is less than said predetermined bandwidth of said virtual circuit.

22. The computer readable medium according to claim 21, wherein said ATM Voice over Adaptation Layer Type 2 (VoAAL2) encapsulation is sub-multiplexed.

23. The computer readable medium according to claim 21, wherein said ATM Voice over Adaptation Layer Type 2 (VoAAL2) encapsulation is non sub-multiplexed.

24. The computer readable medium according to claim 21, wherein each voice data packet of said plurality of voice data packets is encapsulated into one ATM cell of a plurality of ATM cells using said VoAAL2 encapsulation.

25. The computer readable medium according to claim 21, wherein voice data packets of said plurality of voice data packets are encapsulated to fill up each ATM cell of a plurality of ATM cells using said VoAAL2 encapsulation.

26. The computer readable medium according to claim 21, wherein said calculating further comprises:

calculating a cell rate as a function of a plurality of ATM cells necessary to encapsulate one voice data packet of said plurality of voice data packets; and calculating said total utilized bandwidth using said cell rate, said at least one active voice data packet, and said at least one inactive voice data packet.

27. The computer readable medium according to claim 21, wherein said calculating further comprises:

determining an average padding value for a number of bytes necessary to be added to each ATM cell of said plurality of ATM cells subsequent to said encapsulating of said plurality of voice data packets;

calculating a minimum cell rate as a function of a size of one voice data packet of said plurality of voice data packets;

calculating an adjusted cell rate as a function of said minimum cell rate, said predetermined polling period, said at least one active voice data packet, and said at least one inactive voice data packet; and calculating an encapsulation cell rate as a function of said at least one active voice data packet, and said at least one inactive voice data packet.

28. The computer readable medium according to claim 27, wherein said calculating further comprises calculating said total utilized bandwidth as a minimum between said adjusted cell rate and said encapsulation cell rate.

29. A system for controlling admission of a voice communication having a predetermined communication bandwidth in a network, said network including at least one communication link supporting a virtual circuit having a predetermined bandwidth, said system comprising:

a gateway module in said network, said gateway module coupled to said at least one communication link, said gateway module including a processing module for calculating a total utilized bandwidth of said virtual circuit according to a predetermined formula, said total utilized bandwidth including said communication bandwidth, wherein said processing module calculates said total utilized bandwidth according to an ATM Voice over IP (VoIP) encapsulation wherein said virtual circuit includes a plurality of voice data packets encapsulated into a plurality of ATM cells using said VoIP encapsulation, wherein said processing module further calculates a cell rate as a function of a number of ATM cells of said plurality of ATM cells necessary to encapsulate one voice data packet of said plurality of voice data packets;

said processing module granting admission to said communication in said network if said total utilized bandwidth is less than said predetermined bandwidth of said virtual circuit.

30. The system according to claim 29, wherein said network is an Asynchronous Transfer Mode (ATM) network.

31. The system according to claim 29, wherein said processing module calculates said total utilized bandwidth using lookup tables.

32. The system according to claim 29, wherein said predetermined bandwidth of said virtual circuit is calculated by a user according to a spreadsheet.

33. The system according to claim 29, wherein said plurality of voice data packets contains at least one active voice data packet having an active silence suppression mechanism and at least one inactive voice data packet having an inactive silence suppression mechanism.

34. The system according to claim 29, wherein said processing module further calculates said total utilized bandwidth using said cell rate, said at least one active voice data packet, and said at least one inactive voice data packet.

35. The system according to claim 29, wherein said processing module calculates said total utilized bandwidth according to an ATM Voice over Adaptation Layer Type 2 (VoAAL2) encapsulation.

36. The system according to claim 35, wherein said ATM Voice over Adaptation Layer Type 2 (VoAAL2) encapsulation is sub-multiplexed.

37. The system according to claim 35, wherein said ATM Voice over Adaptation Layer Type 2 (VoAAL2) encapsulation is non sub-multiplexed.

38. The system according to claim 35, wherein said virtual circuit includes a plurality of voice data packets containing at least one active voice data packet having an active silence suppression mechanism and at least one inactive voice data packet having an inactive silence suppression mechanism.

39. The system according to claim 38, wherein each voice data packet of said plurality of voice data packets is encapsulated into one ATM cell of a plurality of ATM cells using said VoAAL2 encapsulation.

40. The system according to claim 38, wherein voice data packets of said plurality of voice data packets are encapsulated to fill up each ATM cell of a plurality of ATM cells using said VoAAL2 encapsulation.

41. The system according to claim 38, wherein said processing module further calculates a cell rate as a function of a plurality of ATM cells necessary to encapsulate one voice data packet of said plurality of voice data packets and said total utilized bandwidth using said cell rate, said at least one active voice data packet, and said at least one inactive voice data packet.

42. The system according to claim 29, wherein said processing module further updates said total utilized bandwidth when a second admission request for a second communication having a second communication bandwidth is received in said virtual circuit of said network, said total utilized bandwidth including said second communication bandwidth.

43. A system for controlling admission of a voice communication having a predetermined communication bandwidth in a network, said network including at least one communication link supporting a virtual circuit having a predetermined bandwidth, said system comprising:

a gateway module in said network said gateway module coupled to said at least one communication link, said gateway module including a processing module for calculating a total utilized bandwidth of said virtual circuit according to a predetermined formula, said total utilized bandwidth including said communication bandwidth, wherein said processing module calculates said total utilized bandwidth according to an ATM Voice over Adaptation Layer Type 2 (VoAAL2) encapsulation;

said processing module granting admission to said communication in said network if said total utilized bandwidth is less than said predetermined bandwidth of said virtual circuit, wherein said virtual circuit includes a plurality of voice data packets containing at least one active voice data packet having an active silence suppression mechanism and at least one inactive voice data packet having an inactive silence suppression mechanism, wherein said gateway module further polls for a predetermined polling period of time at least one buffer provided for collecting said plurality of voice data packets and encapsulates said plurality of voice data packets into a plurality of ATM cells for transmission through said network.

44. The system according to claim 43, wherein said processing module further determines an average padding value for a number of bytes necessary to be added to each ATM cell of said plurality of ATM cells subsequent to said encapsulating of said plurality of voice data packets, calculates a minimum cell rate as a function of a size of one voice data packet of said plurality of voice data packets, calculates an adjusted cell rate as a function of said minimum cell rate, said predetermined polling period, said at least one active voice data packet, and said at least one inactive voice data packet, and calculates an encapsulation cell rate as a function of said at least one active voice data packet, and said at least one inactive voice data packet.

45. The system according to claim 44, wherein said gateway module further calculates said total utilized bandwidth as a minimum between said adjusted cell rate and said encapsulation cell rate.

46. A method for calculating a bandwidth savings value of a virtual circuit in a network, said virtual circuit having a predetermined bandwidth and supporting a plurality of voice communications, including a plurality of active voice communications, each active voice communication having an active communication bandwidth, the method comprising:

determining a cell drop interval ratio representing a time interval during which an aggregate bandwidth of said active communication bandwidth of said each active voice communication exceeds said predetermined bandwidth of said virtual circuit;

iteratively calculating a value for said predetermined bandwidth of said virtual circuit using said cell drop interval ratio, said plurality of voice communications, and said plurality of active voice communications, until said aggregate bandwidth does not exceed said predetermined bandwidth; and calculating said bandwidth savings value of said virtual circuit using said value for said predetermined bandwidth and said plurality of voice communications on said virtual circuit.

47. The method according to claim 46, wherein said network is an Asynchronous Transfer Mode (ATM) network.

48. The method according to claim 46, wherein said calculating is performed off-line using at least one iterative algorithm.

49. The method according to claim 46, wherein said calculating is performed online.

50. The method according to claim 46, further comprising providing said calculated bandwidth savings value to a user in at least one lookup table.

51. A computer readable medium containing executable instructions which, when executed in a processing system, cause the system to perform a method for calculating a bandwidth savings value of a virtual circuit in a network, said virtual circuit having a predetermined bandwidth and supporting a plurality of voice communications, including a plurality of active voice communications, each active voice communication having an active communication bandwidth, the method comprising:

determining a cell drop interval ratio representing a time interval during which an aggregate bandwidth of said active communication bandwidth of said each active voice communication exceeds said predetermined bandwidth of said virtual circuit;

iteratively calculating a value for said predetermined bandwidth of said virtual circuit using said cell drop interval ratio, said plurality of voice communications, and said plurality of active voice communications, until said aggregate bandwidth does not exceed said predetermined bandwidth; and calculating said bandwidth savings value of said virtual circuit using said value for said predetermined bandwidth and said plurality of voice communications on said virtual circuit.

52. The computer readable medium according to claim 51, wherein said network is an Asynchronous Transfer Mode (ATM) network.

53. The computer readable medium according to claim 51, wherein said calculating is performed off-line using at least one iterative algorithm.

54. The computer readable medium according to claim 51, wherein said calculating is performed online.

55. The computer readable medium according to claim 51, wherein said method further comprises providing said calculated bandwidth savings value to a user in at least one lookup table.

56. A system for calculating a bandwidth savings value of a virtual circuit in a network, said network including at least one communication link supporting a virtual circuit having a predetermined bandwidth and supporting plurality of voice communications, including a plurality of active voice communications, each active voice communication having an active communication bandwidth, said system comprising:

a gateway module in said network, said gateway module coupled to said at least one communication link;

said gateway module including a processing module for:

determining a cell drop interval ratio representing a time interval during which an aggregate bandwidth of said active communication bandwidth of said each active voice communication exceeds said predetermined bandwidth of said virtual circuit;

iteratively calculating a value for said predetermined bandwidth of said virtual circuit using said cell drop interval ratio, said plurality of voice communications, and said plurality of active voice communications, until said aggregate bandwidth does not exceed said predetermined bandwidth; and calculating said bandwidth savings value of said virtual circuit using said value for said predetermined bandwidth and said plurality of voice communications on said virtual circuit.

57. The system according to claim 56, wherein said network is an Asynchronous Transfer Mode (ATM) network.

58. The system according to claim 56, wherein said calculation of said predetermined bandwidth value and said bandwidth savings value is performed off-line using at least one iterative algorithm and transmitted to said gateway module and said processing module for further processing.

59. The system according to claim 56, wherein said processing module performs said calculation of said predetermined bandwidth value and said bandwidth savings value using an algorithm implemented on said gateway module.

60. The system according to claim 56, wherein said bandwidth savings value is provided to a user in at least one lookup table.

* * * * *